Figure 1:
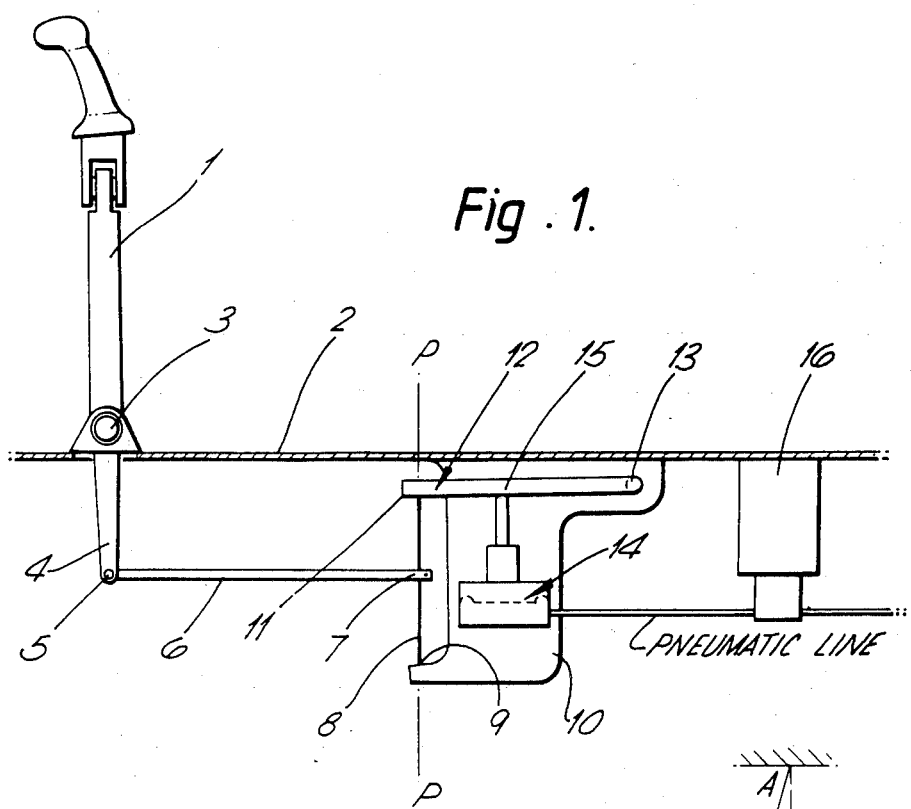

United States Patent [19]

Acklam

[11] Patent Number: 4,568,286

[45] Date of Patent: Feb. 4, 1986

[54] FLIGHT SIMULATOR FEEL SYSTEM

[75] Inventor: Donald J. Acklam, Lancashire, England

[73] Assignee: British Aerospace Public Limited Company, London, England

[21] Appl. No.: 657,481

[22] Filed: Oct. 3, 1984

[30] Foreign Application Priority Data

Oct. 3, 1983 [GB] United Kingdom ............... 8326442

[51] Int. Cl.⁴ ............................................. G09B 9/08
[52] U.S. Cl. .................................................. 434/45
[58] Field of Search ................ 434/45, 258; 273/1 G, 273/1 GE

[56] References Cited

U.S. PATENT DOCUMENTS

| | | | |
|---|---|---|---|
| 2,300,004 | 10/1942 | Nicholson | 434/45 |
| 2,510,174 | 6/1950 | Heller | 434/45 |
| 2,514,606 | 7/1950 | Jenny | 434/45 |
| 3,517,446 | 6/1970 | Corlyton et al. | 434/45 |

Primary Examiner—William H. Grieb
Attorney, Agent, or Firm—Cushman, Darby & Cushman

[57] ABSTRACT

Flight Simulator feel apparatus suitable for use with an elevator control column and a rudder bar is provided by a variably tensioned cable subjected to transverse deflection by movement of the control column or rudder bar as the case may be, whereby a variable control stiffness (feel) is achieved in a simple and effective manner.

8 Claims, 3 Drawing Figures

FLIGHT SIMULATOR FEEL SYSTEM

This invention relates to apparatus for applying a variable force to oppose movement of a movable member. It is particularly, although not exclusively, suitable for use in flight simulators where a control member requires to have a stiffness, that is to say a resistance to movement, provided in order to simulate control forces. In a flight simulator embodiment, it thus provides feel.

Hitherto, in flight simulators, such apparatus has been provided by relatively simple spring and lever arrangements or by relatively complicated computer controlled electro-hydraulic arrangements. In the former case, although relatively inexpensive, it has proved difficult or impossible to vary the control stiffness in accordance with the flight conditions of the simulated aircraft. In the latter case, in addition to providing a variable control stiffness, it is possible to represent a very wide range of control characteristics such as friction and other non-linearities. Although the static forces may be correctly represented, it is difficult to represent the dynamic forces. Moreover, this latter arrangement is expensive.

It is thus an objective of the present invention to provide apparatus which allows control stiffness to be varied, for example by computer means, but which is also relatively inexpensive. The objective does not necessarily require representation of non-linearities.

According to one aspect of the invention, apparatus for applying a variable force to oppose movement of a member comprises, in combination, a fixed structure, an elongate tensioned element carried by the fixed structure having spaced end portions and an intermediate region therebetween, the intermediate region being capable of displacement away from a plane including the two end portions, means for providing a variable tension within the element by urging the end portions relatively apart, and engagement means being moveable with reference to the fixed structure in response to movement of said member and engaging the element intermediate its ends to thereby effect displacement away from said plane.

Figure 3:
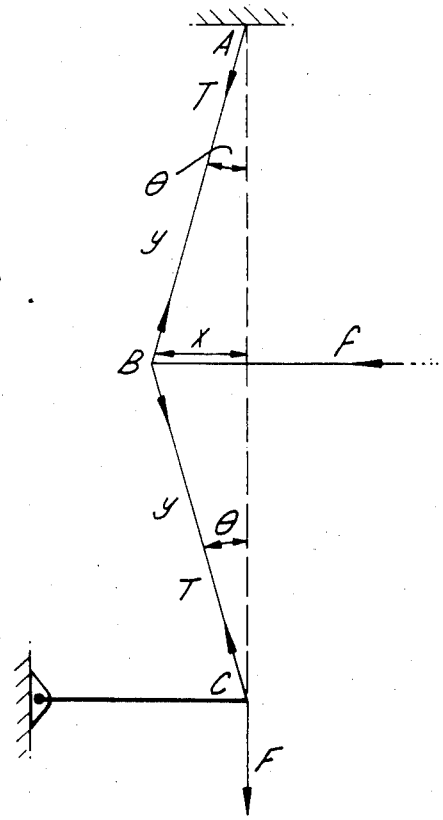
Figure 2:
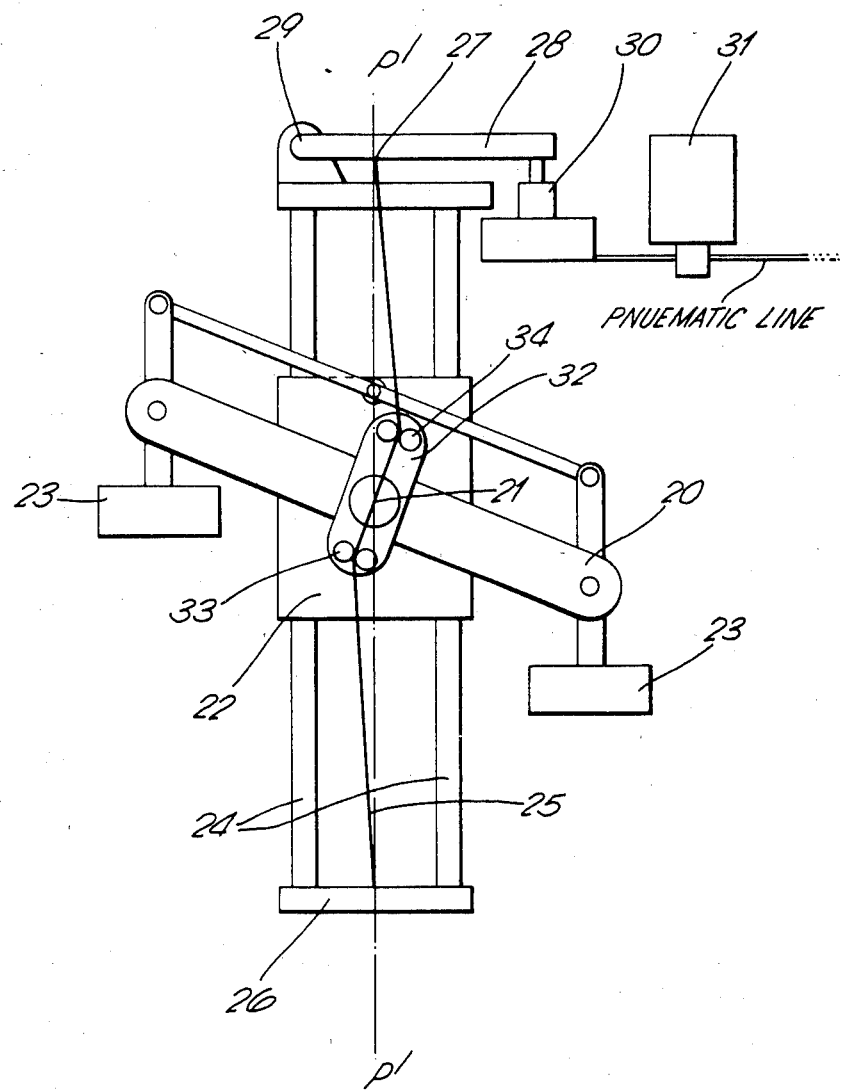

Two embodiments of the invention are now described by way of example with reference to the accompanying drawings in which FIG. 1 is a schematic arrangement suitable for a simulated elevator control column of an aircraft, FIG. 2 is a schematic arrangement suitable for a simulated rudder control bar of an aircraft, and FIG. 3 is a diagram serving as a basis for the theory behind the invention.

Referring to FIG. 1, a flight simulator includes an elevator control column 1 which protrudes above and is mounted on a fixed structure 2 for pivotal movement in a fore-and-aft sense about a horizontal axis 3. Extending below the fixed structure is a lever arm 4 which is integral with the column 1 and accordingly moves with it. Connected to this lever arm 4 is one end 5 of a push-pull rod 6, the other end 7 being clamped to a cable 8. The cable 8 lies generally transverse to the direction of movement of the push-pull rod 6 and the end 7 of the push-pull rod 6 is clamped at or about the mid-point of the cable. One end 9 of the cable is fixedly attached to a mounting bracket 10 carried by the fixed structure while the other end 11 is attached to a free end of a pivoted lever 12, the lever itself being pivoted to the mounting bracket 10 at 13. The ends 9 and 11 lie generally in a notional plane designated P—P. Tension in the cable 8 is regulated by means of a pneumatic actuator 14 carried by the mounting bracket and acting to push against an intermediate portion 15 of the lever 12.

The actuator 14 is chosen to be one of the low friction diaphragm type with few if any rubbing seals between moving parts.

A digitally controlled pressure regulator is provided at 16 in the pneumatic line to the actuator 14. This regulator is computer controlled so that a desired variable pressure is passed to the actuator and hence the cable 8 is variably tensioned.

A further embodiment of the invention is illustrated in FIG. 2.

In this embodiment, a rudder bar 20 is pivoted about a vertical axis 21 on a base member 22. At its lateral ends, the rudder bar is provided with foot pedals 23. The base member 22 is slidably mounted in known fashion on longitudinally extending rails 24, thereby providing adjustment for individual pilots. Naturally, the rails 24 are anchored to a fixed structure. A cable 25 extends longitudinally of the rails and is anchored at one end 26 to the fixed structure and at the other end 27 to an intermediate point on a lever 28. The ends 26 and 27 lie in a notional plane designated P'—P'. The lever is pivoted to the fixed structure at 29 so that variable tensioning of the cable 25 can be effected by a pneumatic actuator 130 and a pressure controller 31 similar to those items respectively referenced 14 and 16 in FIG. 1.

The bar 20 has affixed to it a transverse member 32, the extremities of which are provided with guides in the form of pairs of rollers 33 and 34. Between the rollers of each pair passes the cable 25 such that pivotal movement of the rudder bar 20 causes the respective guides to deflect the cable in opposite directions.

In each embodiment, the cable 8, 25 may be replaced by some other flexible element, for example, a series of links in the form of a chain, or even a strip of material. In the embodiment of FIG. 1, the cable 8 may be replaced by twin links as later discussed with reference to FIG. 3.

In each embodiment separate springs of relatively low rate may be provided to represent breakout effects.

Referring now to FIG. 3, a tensile force F is applied to the end of a flexible element ABC (that is to say cable 8 of FIG. 1 or cable 25 of FIG. 2) by means of suitable tensioning apparatus (that is to say items 12, 14 and 16 of FIG. 1 and the items 28, 30 and 31 of FIG. 2). The element can comprise and is conveniently represented by a pair of freely rotating links AB and BC respectively. Analysis of the forces shows:

1. $T \cos \theta = F$

Where
T = cable (or link) tension
F = applied force
$\theta$ = deflection angle

2. $f = 2T \sin \theta$

Where
f = control force input

3. $x = y \sin \theta$

Where x = input deflection
y = length of link, that is to say 0.5 cable length
Combining these equations we get 4. Input load: $f = 2F \tan \theta$ 5. Input stiffness: $f/x = 2F/(y \cos \theta)$ Hence the control input stiffness is directly proportional to the applied force F. Provided the angle is limited to approximately 20° an acceptable level of linearity is obtained.

The described apparatus offers a simple and economical means of varying control stiffness in flight simulators. Tests have indicated a satisfactory level of linearity coupled with minimal inertia and very low friction levels.

Additionally, the use of a tensioned element as described may have applications in the testing of hydraulic actuators, particularly small, fast actuators, where test loads applied by means of a hydraulic system may not have a high enough frequency response.

I claim:

1. Apparatus for applying a variable force to oppose movement of a member comprises, in combination, a fixed structure, an elongate tensioned element carried by the fixed structure having spaced end portions and an intermediate region therebetween, the intermediate region being capable of displacement away from a plane including the two end portions, means for providing a variable tension within the element by urging the end portions relatively apart, and engagement means being moveable with reference to the fixed structure in response to movement of said member and engaging the element intermediate its ends to thereby effect displacement away from said plane.

2. Apparatus according to claim 1 wherein the variable tension providing means includes a lever arm pivoted to the fixed structure, one end portion of the tensioned element being carried by the lever arm and the other end portion being carried by the fixed structure, and tensioning means urging the lever arm such that tensioning within the element is effected.

3. Apparatus according to claim 2 wherein the tensioning means comprise a pneumatic actuator of the low friction diaphragm type carried by the fixed structure.

4. Apparatus according to claim 1 wherein said tensioned element is of flexible form.

5. Apparatus according to claim 1 wherein the moveable member comprises a control column pivoted to the fixed structure about an axis lying parallel to that plane including the two end portions of the tensioned element and the engagement means comprises a push pull rod lying generally normal to that plane and extending between the control column and the tensioned element.

6. Apparatus according to claim 4 wherein the moveable member comprises a control bar pivoted to the fixed structure about an axis lying within that plane including the two end portions of the tensioned element, and the engagement means comprise guide means for the tensioned element disposed remote from the axis carried by the control bar.

7. Apparatus according to claim 6 wherein the guide means comprise two pairs of rollers, the tension element extending between the rollers of each pair.

8. Apparatus according to claim 7 wherein the fixed structure includes rail means extending parallel to said plane on which the control bar can slide for adjustment purposes, the tension element itself sliding past the guide means as adjustment is effected.

* * * * *